Mar. 6, 1923.

W. J. PEELLE.

PROCESS OF FORMING AND APPLYING GASKETS AND THE LIKE.

FILED OCT. 25, 1920.

1,447,816.

2 SHEETS—SHEET 1.

INVENTOR.

WILLIS J. PEELLE

BY

*Lockwood & Lockwood*

ATTORNEYS

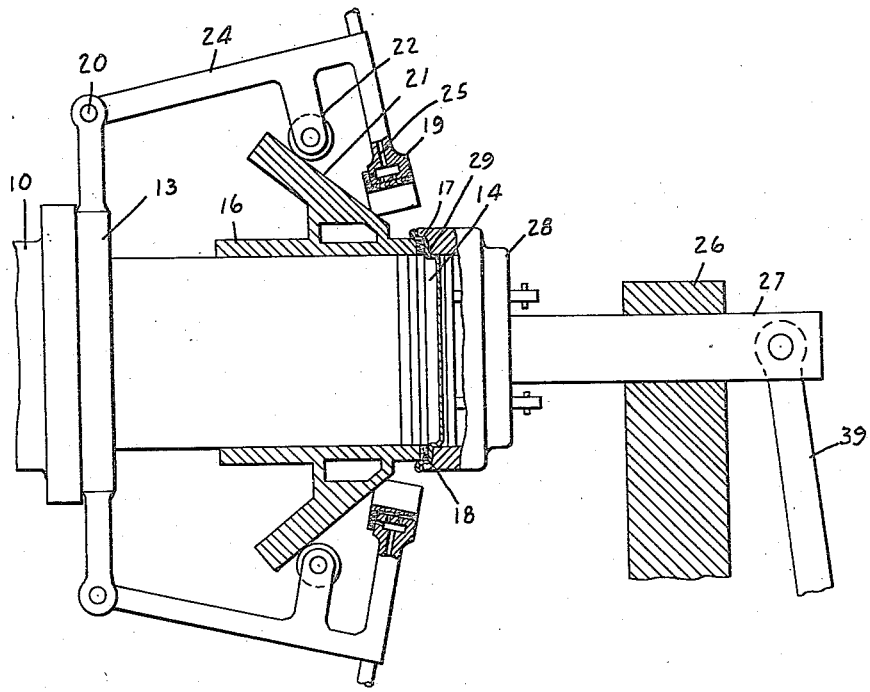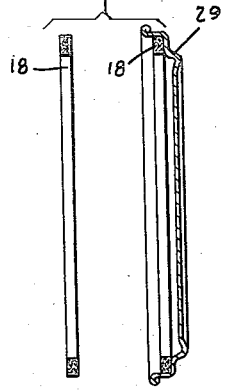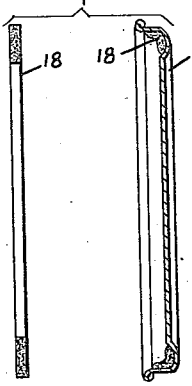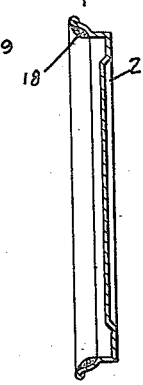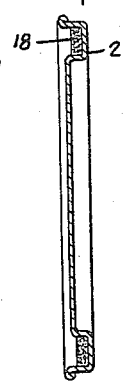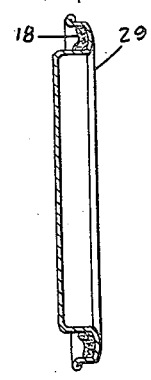

Patented Mar. 6, 1923.

1,447,816

UNITED STATES PATENT OFFICE.

WILLIS J. PEELLE, OF CHICAGO, ILLINOIS.

PROCESS OF FORMING AND APPLYING GASKETS AND THE LIKE.

Application filed October 25, 1920. Serial No. 419,373.

*To all whom it may concern:*

Be it known that I, WILLIS J. PEELLE, a citizen of the United States, and a resident of Chicago, county of Cook, and State of Illinois, have invented a certain new and useful Process of Forming and Applying Gaskets and the like; and I do hereby declare that the following is a full, clear, and exact description thereof, reference being had to the accompanying drawings, in which like numerals refer to like parts.

This invention relates to the process of forming gaskets and the like from a mass of plastic gasket-forming material and at the same time applying the gasket or the like to a jar cover or the like. In carrying out this process, an annular laterally extending thin layer is extruded from a mass of rubber-like gasket-forming material in plastic condition, and the extruded portion is severed to form a ring and is immediately secured, while in heated and plastic condition, to a jar cover and the like.

Another feature of the invention consists in applying suitable adhesive preventive material to the severed portion of the plastic material or gasket.

The full nature of this invention will be understood from the accompanying drawings and the following description and claims.

Figure 1:
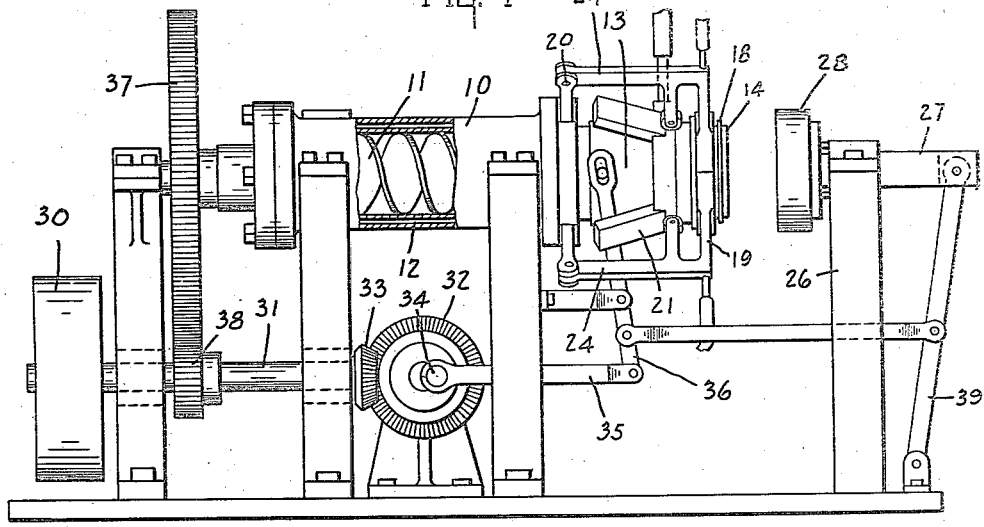
Figure 2:
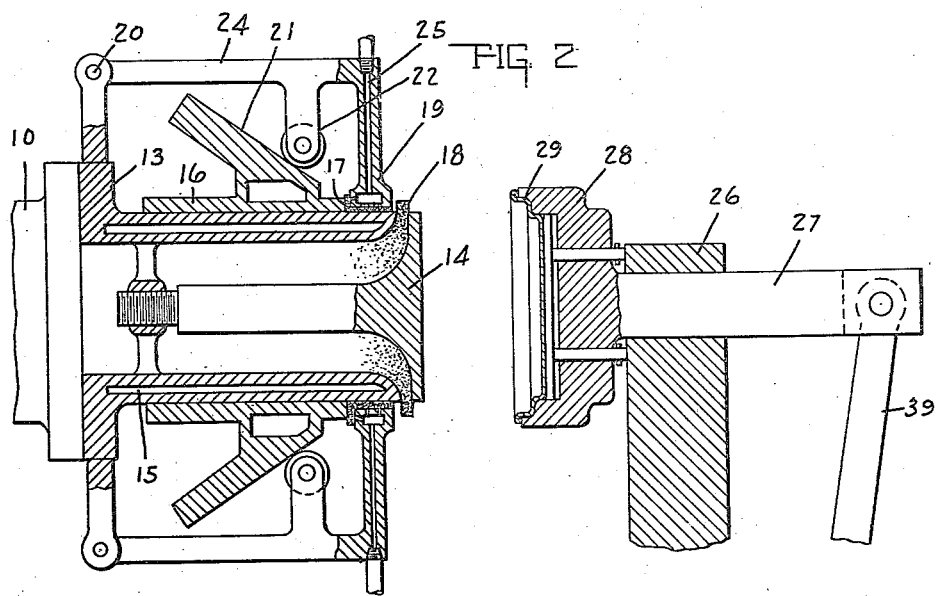

In the drawings Fig. 1 is an elevational view of a machine embodying the principles of the invention and by which the several process steps are accomplished, parts being broken away to show the means for extruding the rubber like material from the mass. Fig. 2 is an enlarged central sectional view of the die means associated with the mechanism illustrated in Fig. 1 and the severing or shearing means, and means for applying adhesive preventative material as well as means for positioning a cap or jar cover or similar article adjacent the die means. Fig. 3 is a view similar to Fig. 2 but illustrates the parts thereof in the securing position. Fig. 4 illustrates one form of gasket or sealing ring and a jar cover or cap to which the same has been secured. Fig. 5 is a modified form of that illustrated in Fig. 4. Figs. 6, 7 and 8 are other modified forms of jar covers to which the sealing rings or gaskets have been secured.

In the drawings there is illustrated a machine whereby the various steps of the process are performed. A synopsis of the steps of the process for making sealing rings or gaskets comprises the extrusion of a predetermined portion of rubber-like material in a plastic condition from the mass and severing said extruded portion of said material to form said ring. Another step in the process which permits said rings to be packed or handled consists in furnishing adhesive preventive material to the machine so that one side of the severed ring will be covered thereby. Another feature of the invention, as previously stated, is the securing of the severed ring or gasket sealing means to a jar cover or the like which operation permits the gasket ring to be secured to the cover while in a plastic condition. This eliminates the reheating of the ring which has heretofore been the practice, and this insures that the ring will be of the proper plasticity and have the proper adhesive qualities necessary for the most efficient positioning within and attachment to the jar cover and the like.

The means for accomplishing the aforesaid steps comprises a main reservoir 10 in which is positioned an extruding member, such as a screw 11, rotated by suitable means. As shown clearly in Fig. 1 the reservoir 10 is jacketed at 12 and suitable media is adapted to be received thereby to maintain the rubber-like material, from which the gaskets and sealing rings are to be made, in a plastic condition within the reservoir 10. Positioned forwardly of the reservoir 10 is an adjustable die head 13, which head is provided with a conical disk head 14 adjustably supported therein. The die head 13, if desired, is preferably jacketed at 15 so as to receive the same media as used within the jacket means 12 so that said material within the reservoir and die head will be maintained in a plastic condition. The die head 13 is herein shown cylindrical in form and a cylindrical sleeve member 16 is associated with said die head and is slidably supported thereon. The cylindrical member 16 is provided with a cutting face 17 which constitutes a shearing edge or severing means such that in the movement of said shearing head from the position shown in Fig. 2 to the position shown in Fig. 3 the portion of extruded material 18 will be severed from the mass and separated therefrom and secured to a jar cover if desired.

From the foregoing explanation it is obvious that as the mass of gasket-forming material is forced out of the head 13, in the thin extruded shape 18, it is extruded laterally of the cylinder head 13 and the disk 14 and beyond their peripheries, whereby the reciprocatory movement of the shearing cylinder 16 will shear the extruded portion and form a gasket or sealing ring.

Associated with the mechanism hereinbefore described, and shown clearly in Figs. 2 and 3, is a plurality of arcuate sections 19 pivotally supported at 20 and movable into and out of engagement with the cylinder, cylindrical die head 13, and the cutting face 17 of the severing sleeve 16.

The means for moving said parts in timed relation includes a cam 21 rigid with the circular sleeve 16 and a cam follower 22 supported by the supporting arm 24 which is pivotally supported at 20 and carries upon its free end the arcuate sections 19. The arcuate section 19 is provided with suitable channel means 25, whereby adhesive preventative material may be introduced through said arcuate sections on to the adhesive surfaces of the die head and the severing sleeve such that in the movement of the sleeve upon the die head said adhesive preventative material will be associated with the extruded portion 18 and prevent said extruded portion, when severed, from adhering to the severing face 17 or the die or disk heads 13 and 14 respectively. Said adhesive preventative material may be of several kinds and the invention is not limited to any particular kind of preventative material.

When the sealing rings are to be fashioned as described and are to be stored for subsequent use upon glass containers, such as that known as the Mason jar, vacuum jar and others of similar type, the adhesive preventative material may be talc powder or other similar material. When, however, the severed ring is to be immediately secured to the jar cover the adhesive preventative material used preferably is water or soap suds, although other means may be substituted therefor.

As shown clearly in Figs. 2 and 3 there is slidably supported by the bracket 26 a stem member 27 to which is secured the cap or jar cover receiving die head 28, said cap or cover being indicated by the numeral 29. As shown clearly in Fig. 3, said cap supporting member 28 is moved from the position shown in Fig. 2 to the position shown in Fig. 3 such that after the extruded portion 18 has been severed from the mass said portion is immediately associated with the newly presented cap 29 and is pressed therein. Due to the quick action of immediately securing the severed portion 18, while in a semi-plastic condition, to the jar cover, the heat in the severed portion and its adhesive qualities are utilized to cause it to adhere more readily and be distributed evenly when pressed into and against the said jar cover. The above described process eliminates the re-heating such as heretofore has been employed for attaching gaskets to jar covers and the like and prevents injuries to the gasket material which heretofore has been incident to the re-heating thereof. The foregoing process also aids in prolonging the life of the gasket and in making a better seal on the glass jar.

The means for actuating all of the foregoing means in timed relation with each other comprises the driving pulley 30, shaft 31, bevel gear and pinion 32 and 33 respectively, the cam 34, crank arm 35 and the main operating lever 36. Associated with the shaft 31 is the gear and pinion 37 and 38 respectively, said gear being adapted to rotate the extruding screw 11, see Fig. 1. The lever 36, through the pivoted lever 39, is adapted to reciprocate the jar cover supporting head 28 in timed relation with the forward reciprocation of the severed sleeve 16 and the removal of the adhesive preventative applying mechanism 19 as described.

While the invention has been described in considerable detail the broader features thereof are not to be limited by said details, but reference is to be had to the appended claims.

The invention claimed is:

1. The process of forming and securing sealing gaskets and the like to jar covers and the like including laterally extruding through suitable die means the required amount of rubber-like material from a plastic mass, severing said extruded material from the plastic mass, and immediately securing said severed material to the jar cover and the like.

2. The process of forming and securing sealing gaskets and the like to jar covers and the like, laterally extruding through suitable die means the required amount of gasket-forming material from a plastic mass, severing said extruded material from the plastic mass, and securing the extruded material to a jar cover and the like at the severing position.

3. The process of forming and securing sealing gaskets and the like to jar covers and the like, including laterally extruding through a cylindrical die means an annular body of gasket-forming material from a plastic mass, severing said annular body of extruded material for forming a gasket ring, and securing said gasket ring to a jar cover and the like by continuing the severing movement of the gasket and the like.

4. The process of forming and securing sealing gaskets and the like to jar covers and the like, including laterally extruding through a cylindrical die means an annular body of gasket-forming material from a plastic mass, severing said annular body of extruded material for forming a gasket ring, securing said gasket ring to a jar cover and the like by continuing the severing movement of the gasket and the like, and simultaneously moving the jar cover and the like towards the severing position and against the gasket as it is being moved from the severed position to secure it to the jar cover and the like.

5. The process of forming and securing sealing gaskets and the like to jar covers and the like including extruding through suitable die means the required amount of rubber-like material from a plastic mass, severing said extruded material from the plastic mass, supplying an adhesive preventative material to the same, and immediately securing said severed material to the jar cover and the like.

6. The process of forming and securing sealing gaskets and the like to jar covers and the like, including extruding through suitable die means the required amount of rubber-like material from a plastic mass, severing said extruded material from the plastic mass, supplying an adhesive preventive material to one side thereof and leaving the other side free for adherence to the jar cover and the like; and immediately securing said severed material to the jar cover and the like.

7. The process of forming and securing sealing gaskets and the like to jar covers and the like, including heating gasket-forming material in a mass, cutting an annular gasket ring therefrom, and immediately applying it to a jar cover and the like while it is still heated so that it will adhere thereto.

8. The process of forming and securing gaskets and the like to jar covers and the like, including heating a mass of gasket-forming material, extruding through suitable die means the required amount of said material in annular form, supplying an adhesive preventive to the extruded portion, severing said extruded portion from the mass, and immediately securing said severed material to the jar cover and the like, utilizing the plastic and adhesive qualities of the rubber-like material due to the original heat by the quick and substantially simultaneous action of making the gasket ring direct from the heated mass, and immediately securing it to the jar cover and the like.

9. The process of forming and securing sealing gaskets and the like to jar covers and the like consisting of extruding through suitable die means the required amount of rubber-like material from a plastic mass, severing said extruded material from the plastic mass, supplying an adhesive preventative material to the same, and immediately securing said severed material to the jar cover and the like utilizing the plasticity and adhesive qualities of the rubber like material due to the original heat by the quick and simultaneous action of making the gasket ring direct from the mass and immediately securing it to the jar cover.

In witness whereof, I have hereunto affixed my signature.

WILLIS J. PEELLE.